(No Model.) O. M. PETERSON. 11 Sheets—Sheet 2.
MACHINE FOR SETTING AND DISTRIBUTING TYPE AND PRODUCING IMPRESSIONS THEREFROM.
No. 574,935. Patented Jan. 12, 1897.
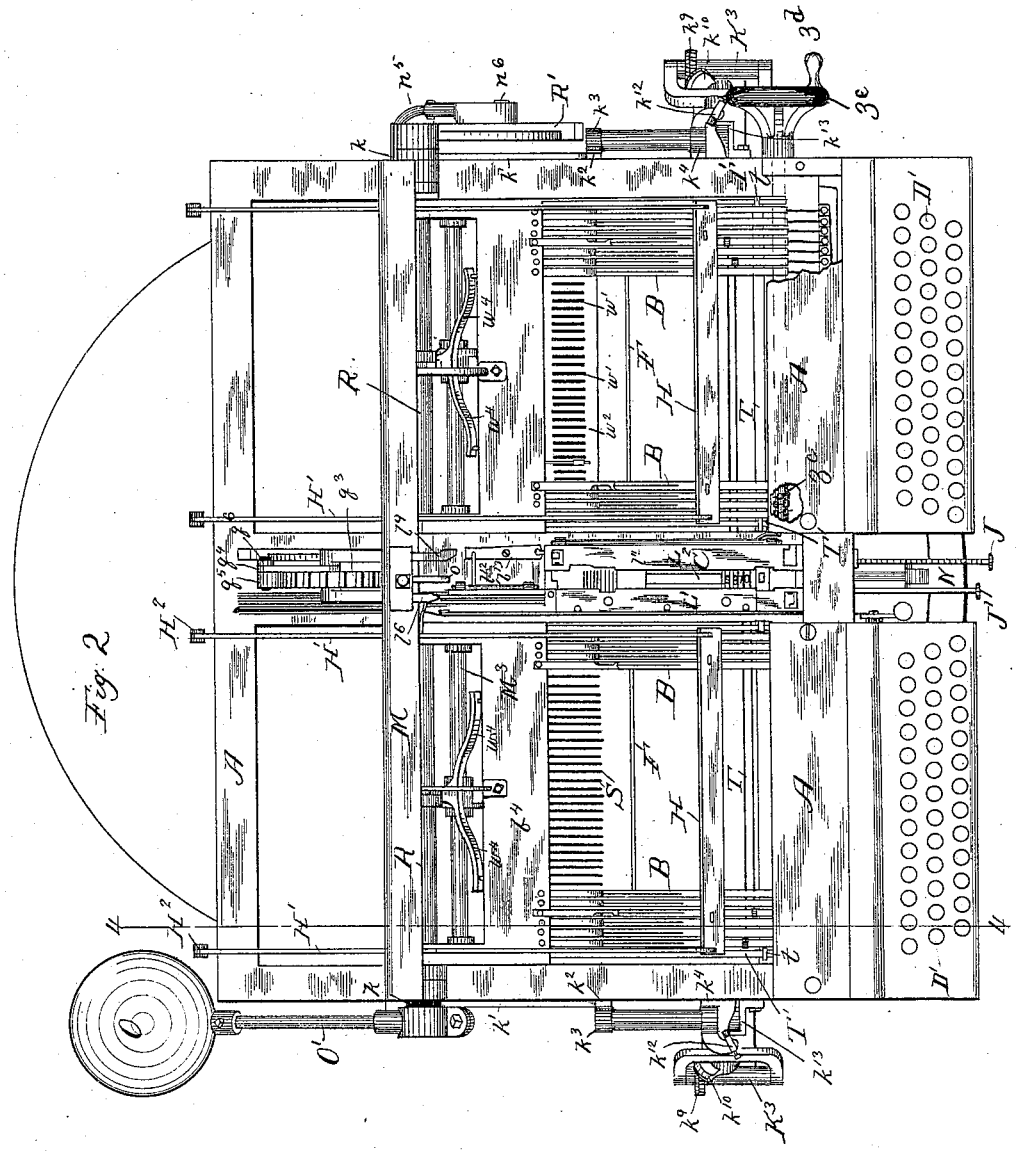

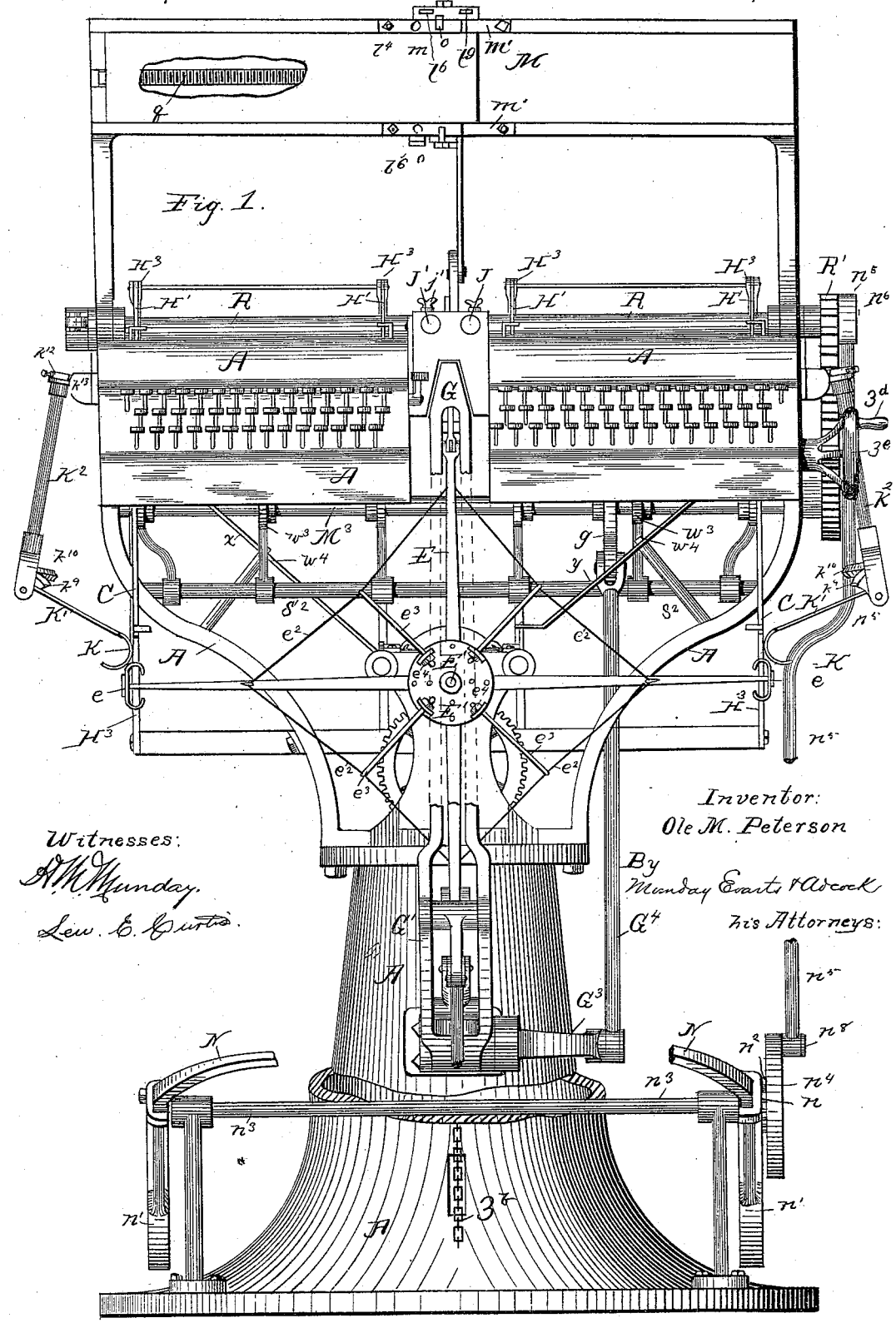

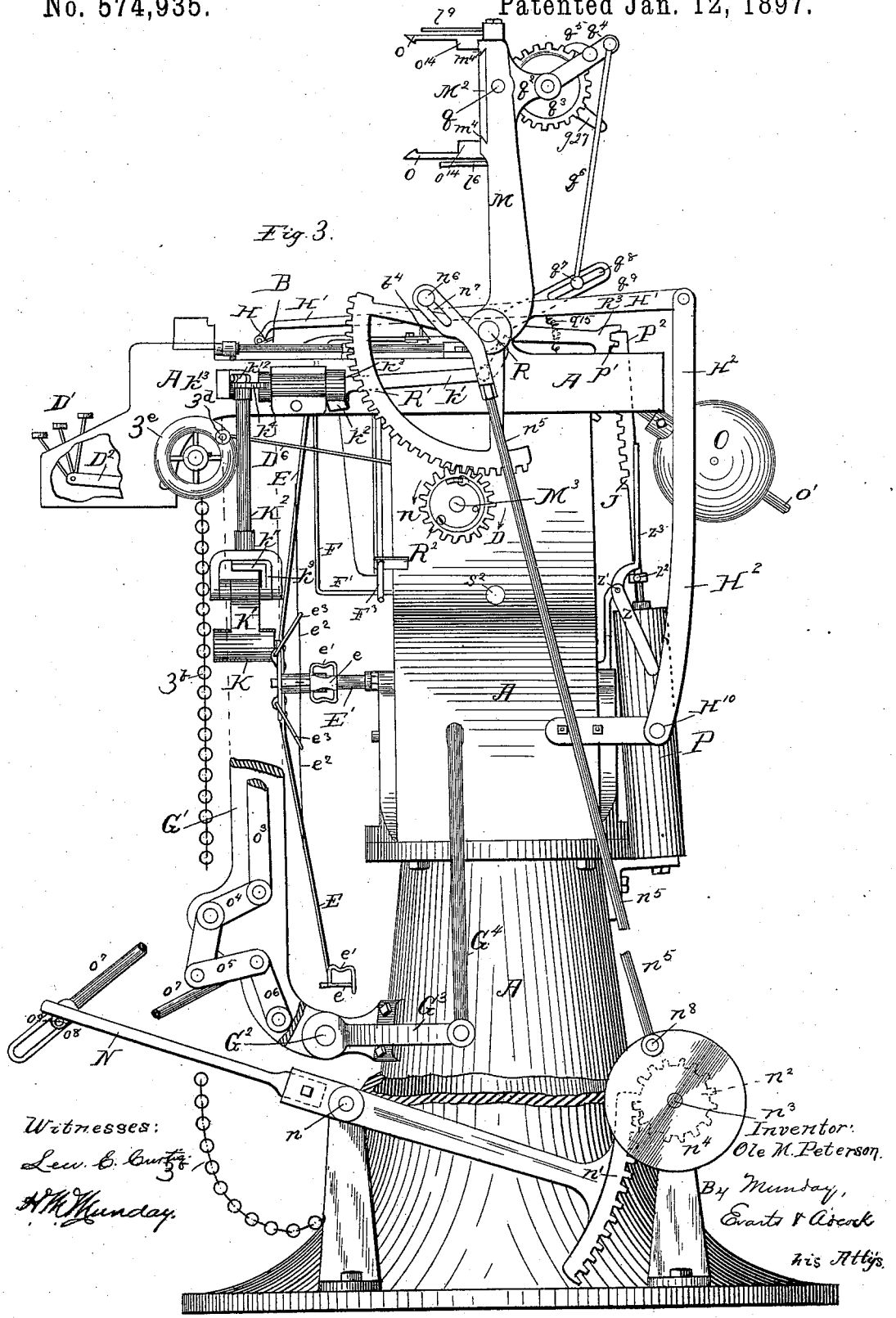

(No Model.)
O. M. PETERSON.
11 Sheets—Sheet 4.
MACHINE FOR SETTING AND DISTRIBUTING TYPE AND PRODUCING IMPRESSIONS THEREFROM.
No. 574,935.
Patented Jan. 12, 1897.
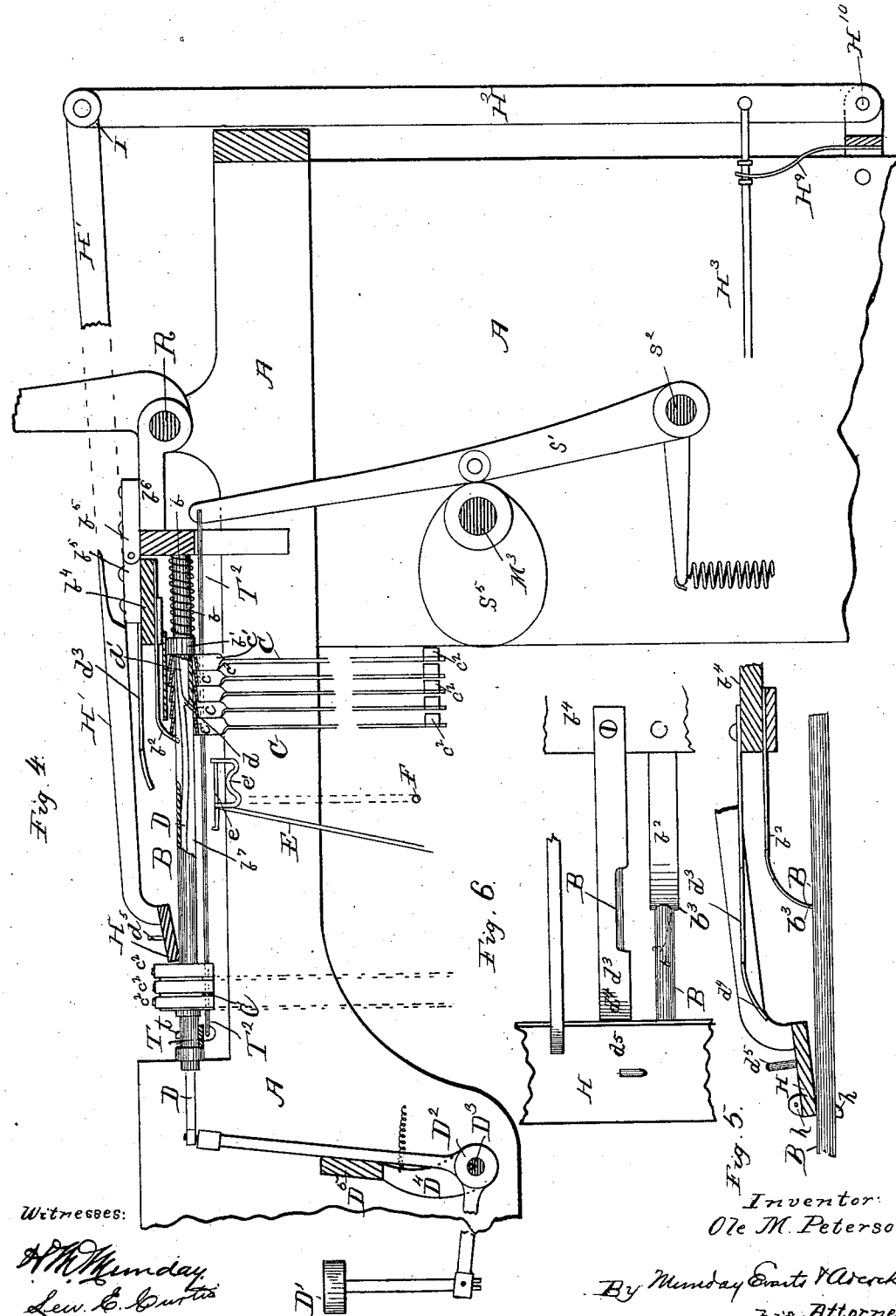
Witnesses:
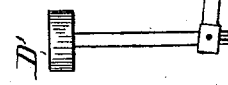
Lew. E. Curtis
Inventor:
Ole M. Peterson
By Munday Evarts & Adcock
his Attorneys (No Model.) O. M. PETERSON. 11 Sheets—Sheet 5.
MACHINE FOR SETTING AND DISTRIBUTING TYPE AND PRODUCING
IMPRESSIONS THEREFROM.
No. 574,935. Patented Jan. 12, 1897.
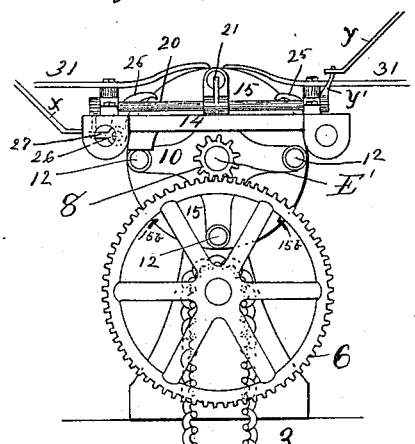
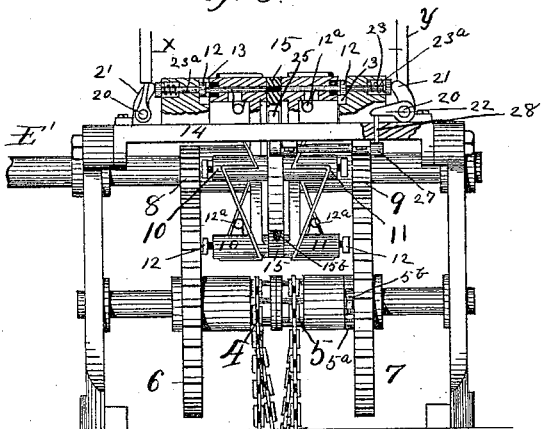
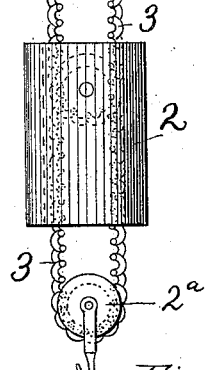
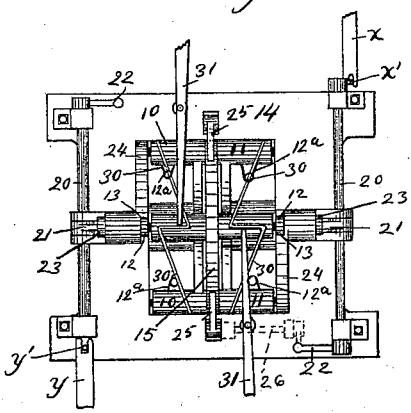
Witnesses:
A. W. Munday.
Lew. E. Curtis.
Inventor:
Ole M. Peterson,
By Munday Evarts & Adcock
his Attorneys.

(No Model.) O. M. PETERSON 11 Sheets—Sheet 6.
MACHINE FOR SETTING AND DISTRIBUTING TYPE AND PRODUCING IMPRESSIONS THEREFROM.
No. 574,935. Patented Jan. 12, 1897.
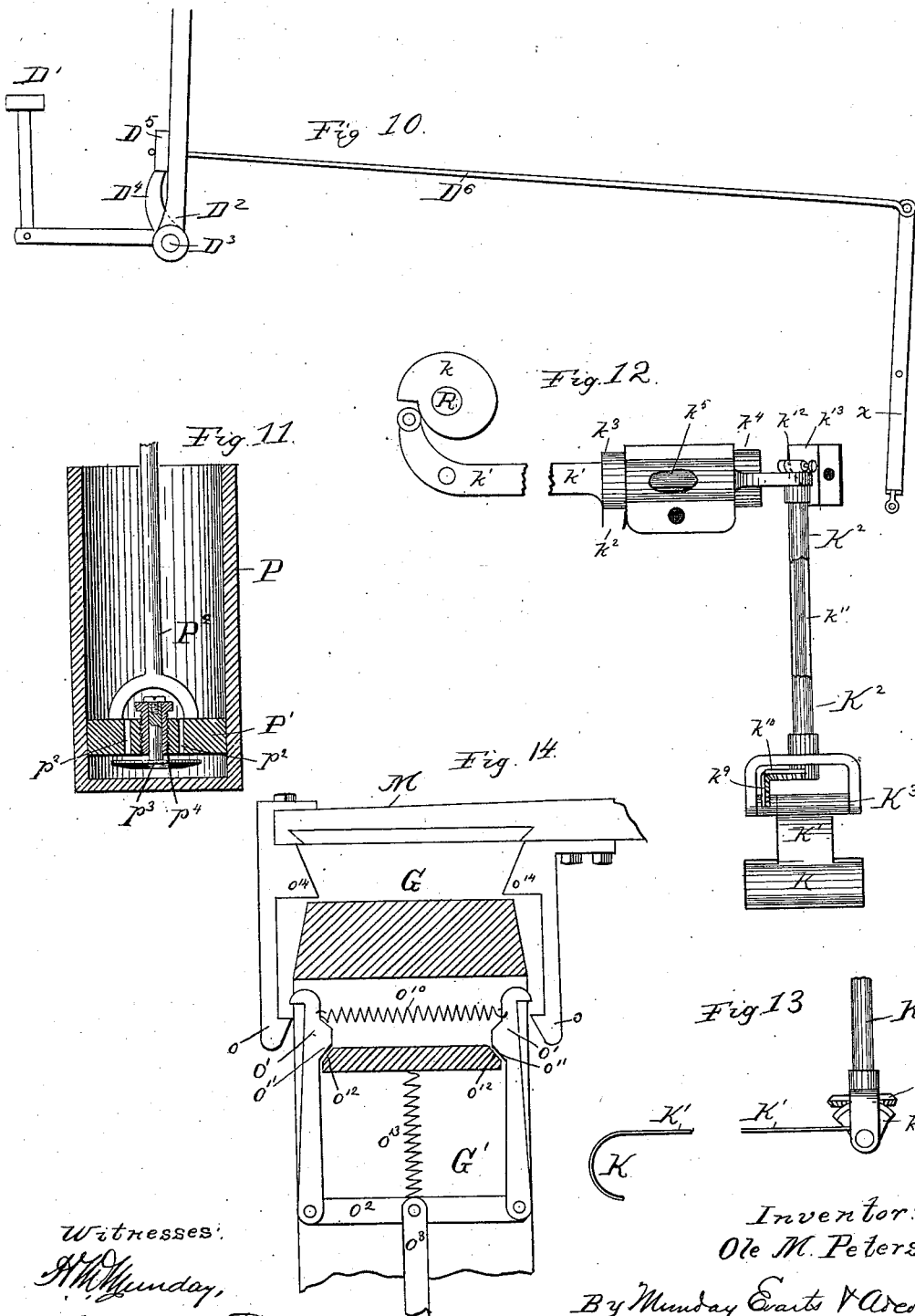

(No Model.) O. M. PETERSON. 11 Sheets—Sheet 7.
MACHINE FOR SETTING AND DISTRIBUTING TYPE AND PRODUCING
IMPRESSIONS THEREFROM.
No. 574,935. Patented Jan. 12, 1897.
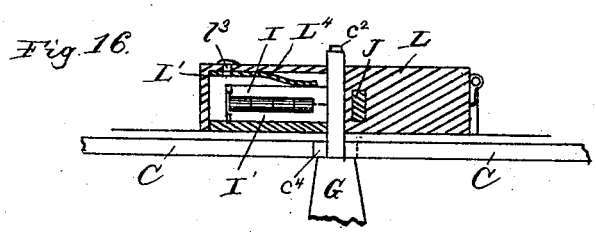
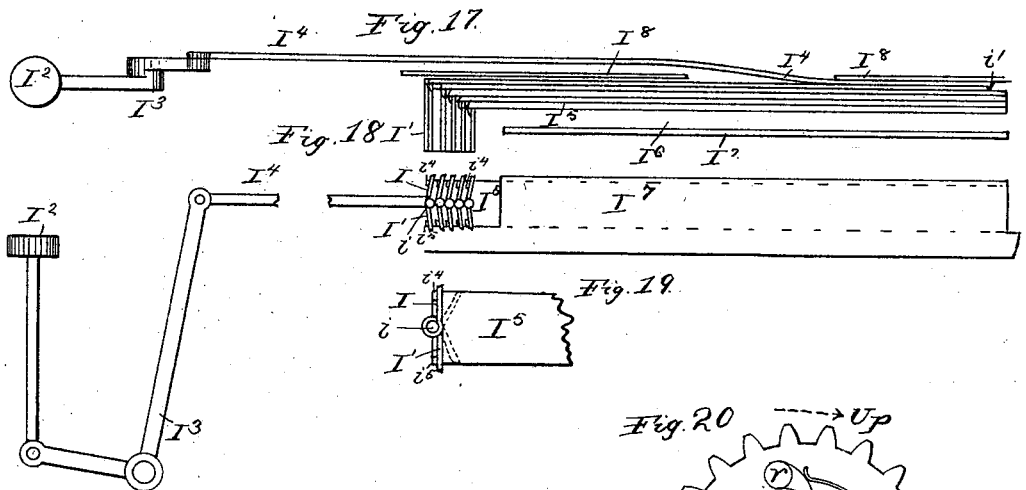
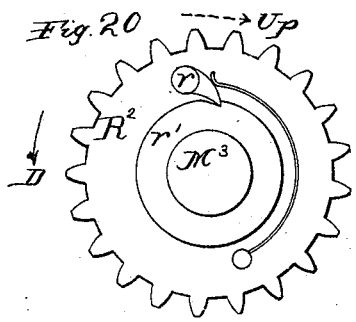
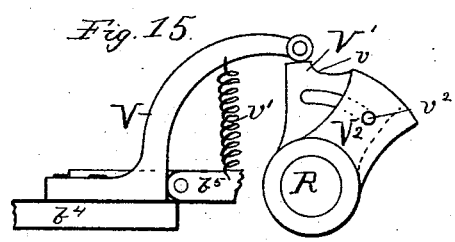
Witnesses:
H. W. Munday,
Lew. E. Curtis
Inventor:
Ole M. Peterson;
By Munday Evarts & Adcock
His Attorneys:

(No Model.) O. M. PETERSON. 11 Sheets—Sheet 8.
MACHINE FOR SETTING AND DISTRIBUTING TYPE AND PRODUCING IMPRESSIONS THEREFROM.
No. 574,935. Patented Jan. 12, 1897.
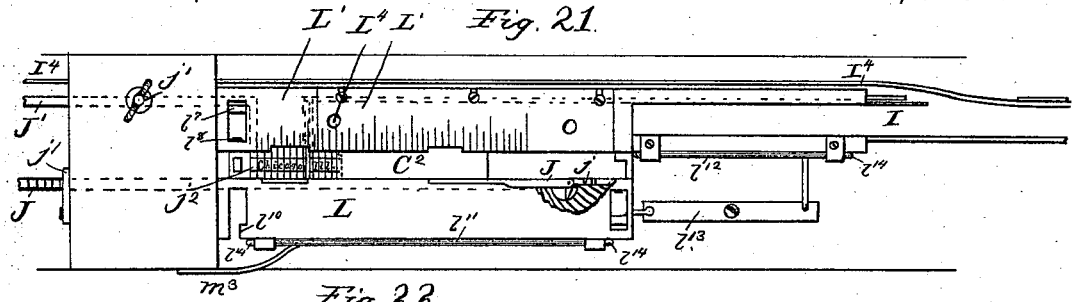
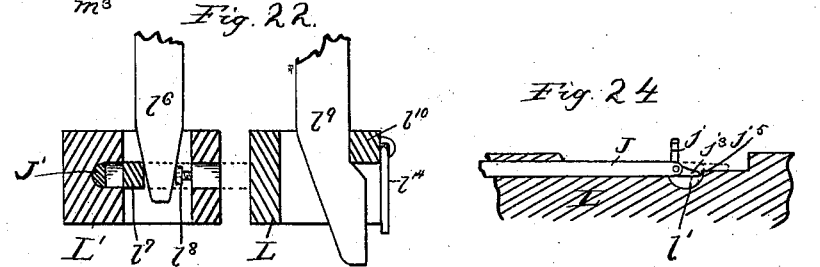
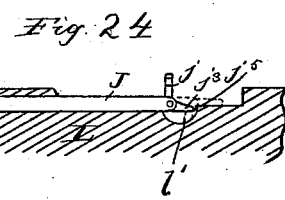
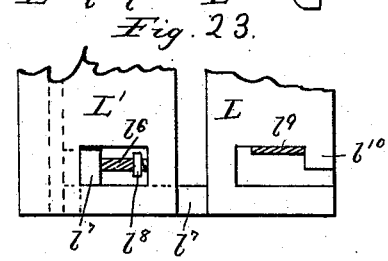
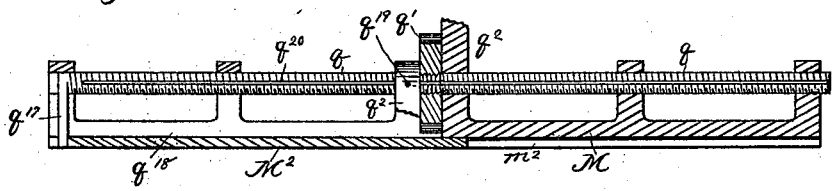
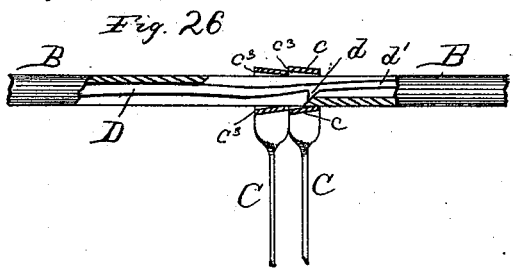
Witnesses:
H. W. Munday,
Lew. E. Curtis.
Inventor:
Ole M. Peterson.
By Munday Evarts & Adcock
his Attorneys (No Model.) O. M. PETERSON. 11 Sheets—Sheet 9.
MACHINE FOR SETTING AND DISTRIBUTING TYPE AND PRODUCING IMPRESSIONS THEREFROM.
No. 574,935. Patented Jan. 12, 1897.
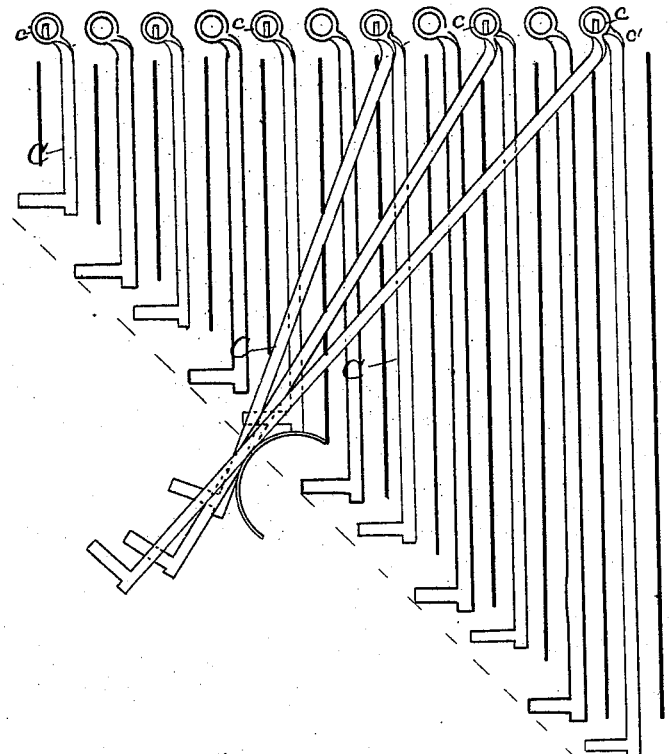
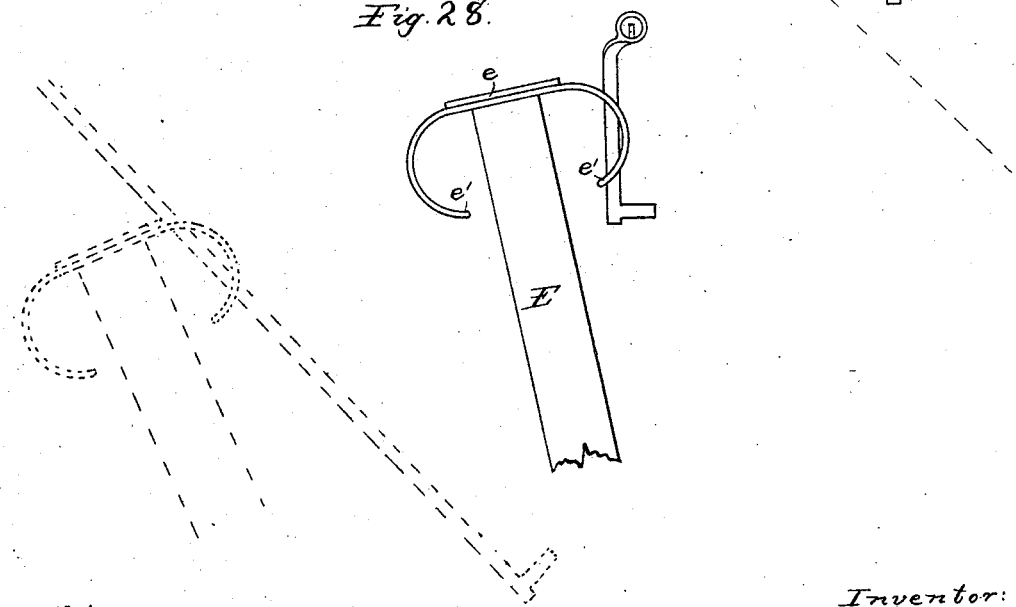
Witnesses:
Inventor:
Ole M. Peterson
By Munday, Evarts & Adcock
his Attorneys (No Model.) O. M. PETERSON. 11 Sheets—Sheet 10.
MACHINE FOR SETTING AND DISTRIBUTING TYPE AND PRODUCING
IMPRESSIONS THEREFROM.
No. 574,935. Patented Jan. 12, 1897.
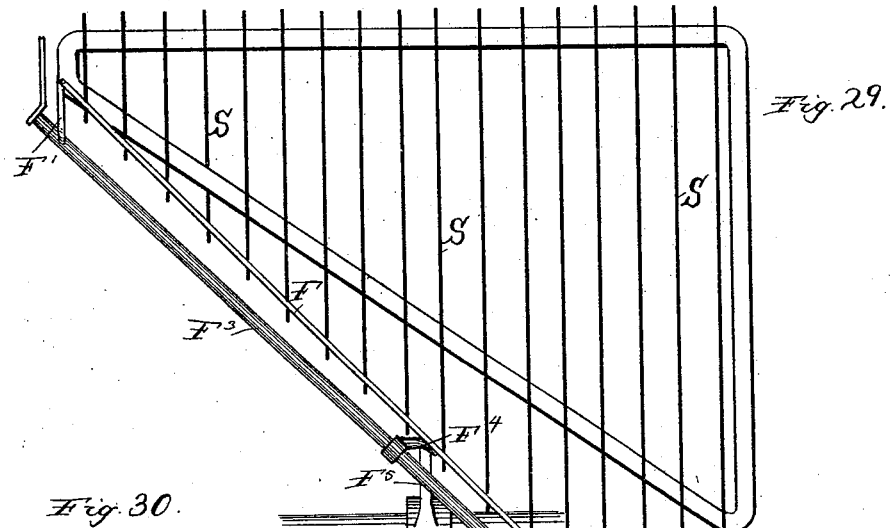
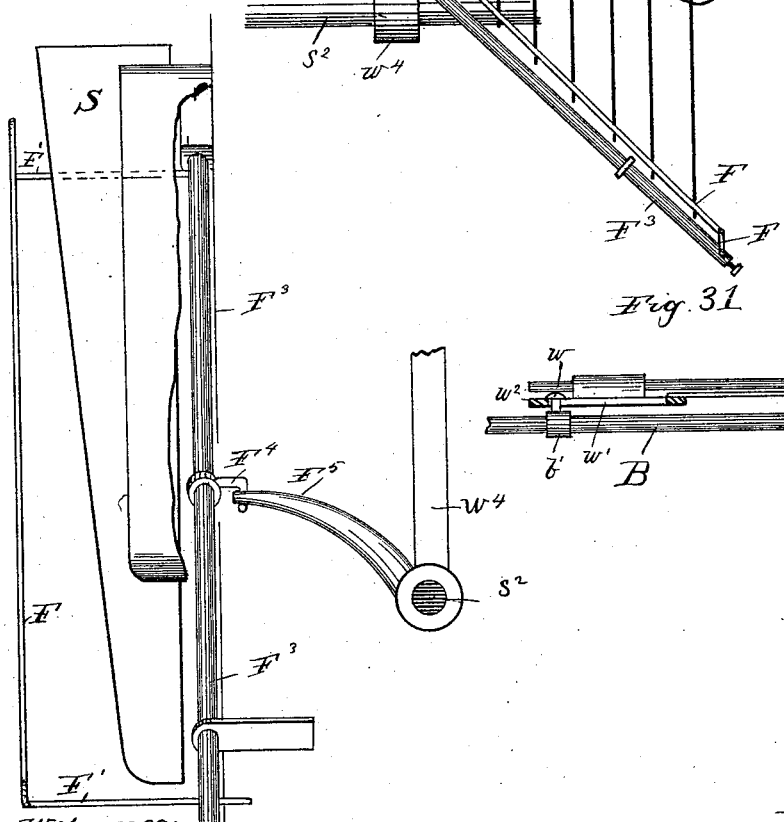
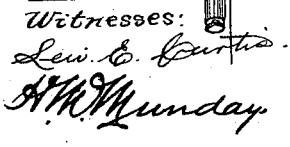

(No Model.) O. M. PETERSON. 11 Sheets—Sheet 11.
MACHINE FOR SETTING AND DISTRIBUTING TYPE AND PRODUCING IMPRESSIONS THEREFROM.
No. 574,935. Patented Jan. 12, 1897.
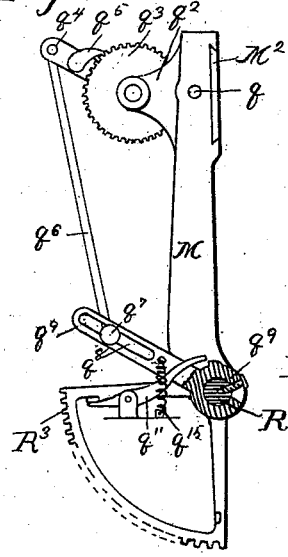
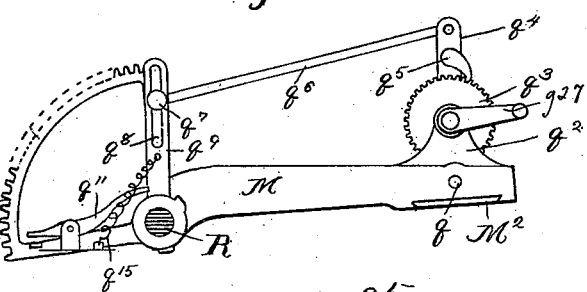
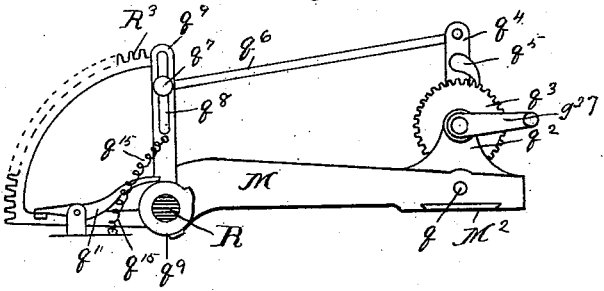
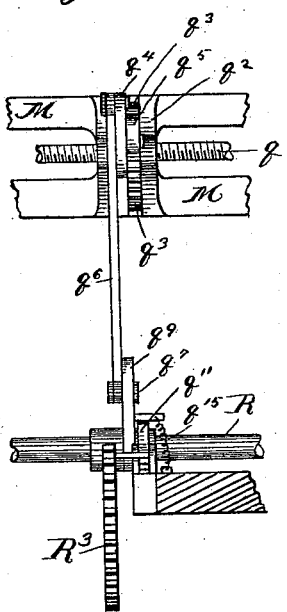
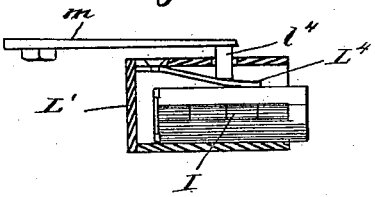
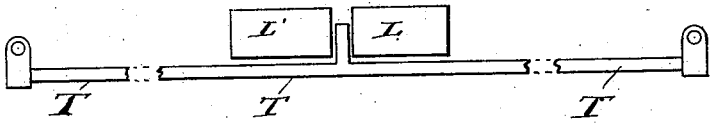
Witnesses
Lew. E. Curtis
H. W. Munday.
Inventor:
Ole M. Peterson
By Munday Evarts & Adcock
his Attorneys

United States Patent Office.

OLE M. PETERSON, OF CHICAGO, ILLINOIS.

MACHINE FOR SETTING AND DISTRIBUTING TYPE AND PRODUCING IMPRESSIONS THEREFROM.

SPECIFICATION forming part of Letters Patent No. 574,935, dated January 12, 1897.

Application filed March 22, 1886. Serial No. 196,061. (No model.)

*To all whom it may concern:*

Be it known that I, OLE M. PETERSON, a subject of the King of Sweden and Norway, residing in Chicago, in the county of Cook and State of Illinois, have invented a new and useful Improvement in Machines for Setting and Distributing Printing-Types and for Producing Impressions Therefrom, of which the following is a specification.

This invention relates to that class of type-setting machines wherein a limited number of type are employed and set up line by line, an impression being taken from each successive line as it is set up and the type then distributed before another line is set up.

In a machine embodying my invention a requisite number of each kind of type are secured to a series of type-arms mounted pivotally on a series of stationary parallel rods on which they may slide longitudinally. As all the type of the same kind or letter are mounted on the same rod the type will automatically distribute themselves by simply swinging into a vertical position from their pivotal support or rod. The rods on which the different sets of type-arms are mounted are all arranged parallel to each other and in the same plane. The direction of the line of type when set up is parallel with these rods or at right angle to the type-arms, and each set of type-arms is consequently of different length, but all the type-arms of the same set are, of course, of the same length. The type-arms all have two kinds of movements—one a swinging or pivotal movement on their rods to bring the face of the type into a horizontal position and the other a longitudinal movement on their rods to bring the type into their proper position in the line. When the type are distributed or not in use, all the type-arms of each set are assembled at the rear end of their supporting-rod and there held by a spring-pawl or other equivalent device, against which they are pressed by means of a spring, preferably a spiral one, mounted on the rear end of the supporting-rod. This spring serves always to press the forward type-arm into position against the spring-pawl, whatever may be the number of type-arms back of the spring-pawl; that is to say, as each type-arm is pulled forward for use this spring pushes the remaining type-arms ahead, so that the next type-arm is then in position to be pulled forward for use. The type-arms are pulled forward in turn as required for use from behind the spring-pawl by means of a reciprocating hook or equivalent device actuated from the key and which engages the forward type-arm and pulls it forward on its rod from beneath the spring-pawl and into position to be raised or swung up, so as to bring the face of the type horizontal. The type-arm is then swung up by means of a movable or rotary sweeper or elevating device actuated by or from the same movement of the key. The type-arm is next moved forward longitudinally to bring the type into its proper position in the line, one end, of course, being supported by the rod on which it is pivoted and the other end by means of a movable support or bed, which stands on about a level with the sweeper and in juxtaposition therewith, when the sweeper is moved or turned so as to bring the type-arm into its horizontal position. The forward or longitudinal movement of the type-arm is effected by a reciprocating pushing-bar arranged, preferably, just above the parallel type-arm-supporting rods and which is provided with a number of projections or fingers extending between the parallel supporting-rods, which fingers engage the type-arm swung into a horizontal position beneath the rods. These fingers may be pivoted to the pushing-bar, so that when the pushing-bar moves back the fingers may drop over the elevated type-arm into position for pushing the same forward when the forward movement is given to the pushing-bar. This pushing-bar is also actuated from the same movement of the key by suitable intermediate mechanism.

Each type-arm has an offset or bend near its eye to permit of its being swung into a horizontal position, so as to lie immediately under the parallel rods and transversely thereto. The eye of each type-arm is so beveled as to allow the reciprocating hook to pass between it and the type-arm behind it and engage with the one in front of it, so as to pull it forward from beneath the spring-pawl. After a complete word has been in this way set up by depressing the appropriate keys in their order, an automatically-adjustable spacing device is next inserted in the line by depressing a key, and another word then set up, until the line is completed, a spacing device being inserted between each two words. The length of the line is then fixed by pulling a locking-bar into the proper position at the end of the line, according to the width of the column or page wherein the line forms a part.

Any automatic spacing device may be used, but I prefer to use one consisting of a pair of hinged leaves, which stand between the words, with their pivot or joint near the middle of the two adjoining types. These leaves operate as a knee-joint lever when pressure is brought to bear on their top and bottom edges, thus causing them to spread and increase the distance between the words and force the type of each word snugly together. As all spacing devices employed in the machine are alike, it is obvious that an equal space will be produced between each two words in the line whatever may be the aggregate space between the words in each line. An equal pressure is applied to all the spacing devices in the line by depressing a horizontal bar or leaf extending over the upper edge of the hinged leaves. After or at the same time the line is in this way justified it is straightened and the face of the types leveled by means of a straightening-bar on one or both sides of the line, which bar has both a downward movement to level the face of the type by pressing on all the type-arms in the line and an inward movement against the types in the line to produce a perfectly straight line. The impression is next taken on a suitable matrix or mold, which is secured to a movable plate on an impression-bed by pressing said matrix or mold against the line of type. As the impression-bed moves back after taking the impression the matrix-plate is automatically moved the space of one line, so that the matrix will be in a proper position for receiving an impression of the next line. After the impression has been taken the type-arms are permitted to swing back into a vertical position and by a reciprocating pusher-bar pulled back to their original position under the spring-pawls, which are elevated slightly to permit the type-arms to pass under the same and are again let down before the pusher-bar recedes. This redistribution of the type or type-arms is accomplished by first removing the bed or bar on which the line of type rests, which is done automatically, allowing the type-arms to rest on a supporting bar or roller, which is gradually and automatically lowered, preferably on a line of about forty-five degrees from the vertical, so that each type-arm will rest on the roller until it reaches the vertical position and thus have no tendency to vibrate. This roller is of such diameter as to always keep the longer type-arms below the upward projecting ends of the type on the shorter type-arms, thus preventing the same from crossing and becoming entangled while being lowered. As a precaution against the entanglement of the type-arms while being pushed back into their original position or at other times, I employ a thin plate between the type-arms depending from each rod, thus forming a box or stall for the type-arms of each kind of type or character of the alphabet.

In order to make the machine more compact and obviate the necessity of employing type-arms of great length, I arrange part of them on each side of the line, preferably those carrying capital letters on the left-hand side and those carrying lower-case or small letters on the right-hand side of the operator, so that the type-arms on each side of the line are swung in opposite directions to bring their type into the line. The sweepers which I employ to elevate the type-arms therefore move in opposite directions when keys on different sides of the line are depressed.

As the force required to give the necessary movements to the different parts of the machine is greater than can be rapidly, conveniently, and successfully exerted by the operator upon the keys with his fingers, I operate the sweepers which elevate the type-arms and the pushing-bar which moves them into position in the line by power, which may be applied in any suitable manner, preferably by a spring or weight, the depression of the key serving simply to put such power in operation.

The impression-bed is pivoted by suitable arms or frame-pieces to a transverse shaft and is operated by a treadle or foot-lever, two kinds of connecting mechanism being employed, one operating to swing the impression-bed down quickly from its vertical position within a short distance of the type and the other mechanism consisting of grappling hooks or catches connected with the foot-lever, preferably by toggle-levers, so as to force the impression-bed with great pressure down upon the face of the type to produce the desired impression.

The impression-bed is swung back by means of a weight secured to an arm on the opposite side of the impression-bed shaft, and this weight is made heavy enough to operate the main cam-shaft of the machine as the impression-bed is elevated, said cam-shaft being connected by suitable gears or mechanism with the impression-bed shaft. Suitable cams on this cam-shaft thus operated communicate the proper movements, in the appropriate order of time, to the movable bed or support upon which the type rest when the impression is taken, to the pulling-bar by which the type-arms are brought back to their original position after being used in the line, and to other mechanisms to be more fully described hereinafter.

The bar or leaf which operates the spacing devices is automatically actuated directly from the impression-bed as it makes its downward movement by a suitable projection or spring thereon, the straightening or alining bars being operated in a similar manner both to straighten the line and to level the face of the types. Proper movement is also imparted to the rest or roller which gradually lowers the type-arms from the impression-bed shaft through suitable connecting mechanism. A cam on the impression-bed shaft also elevates the spring-pawls so that the type-arms may pass under the same into their original position, as the impression-bed recedes after taking an impression of each line of type. The locking-bars for regulating the length of the line are adjusted and fixed into position by hand in the machine shown in the accompanying drawings; but it may be found desirable to operate at least one of them automatically. The mechanism for moving the matrix or mold the required distance between the lines is also actuated automatically by the upward movement of the impression-bed.

My invention primarily consists, in combination with a series of parallel type-arm-supporting rods, of a series of swinging and sliding type-arms mounted thereon; also, in connection therewith, of a suitable device for swinging or elevating the type-arms from a vertical into a horizontal position; also, in connection therewith, of a suitable device for pushing or sliding the type-arms into position on their supporting-bed; also, in connection therewith, of a suitable device for gradually lowering the type-arms into a vertical position after the impression has been taken; also, in connection therewith, of a series of parallel plates or stalls for separating the type-arms as they are moved into their original position to prevent their entangling; also, in connection therewith, of an auxiliary power set in action by the operating-key to actuate the devices for swinging and reciprocating the type-arms into position in the line.

My invention also consists in the various novel devices and novel combinations of devices or operating parts by means of which the several functions of the machine are performed and its general or final results accomplished, as hereinafter more particularly pointed out in the claims; and so far as these principal features of the invention are concerned the particular mechanism or means employed to give to the various devices or operating parts their requisite movements are not important, and other suitable means or mechanisms for actuating such devices or operating parts may be used without departing from the essential nature and principle of my invention or machine.

In the accompanying drawings, which form a part of this specification, and in which similar letters of reference indicate like parts, Figure 1 is a front view of a machine embodying my invention. Fig. 2 is a plan view of the same. Fig. 3 is a side view looking at the right side of the machine. Fig. 4 is an enlarged vertical sectional view on line 4 4 of Fig. 2. Figs. 5 and 6 are enlarged detail side and plan views, respectively, of the pushing-bar. Figs. 7 and 8 are enlarged front and side views of the driving mechanism. Fig. 9 is a plan view of the same. Fig. 10 is an enlarged side elevation of one of the keys and its connections. Fig. 11 is a sectional view of the governor device for regulating the backward movement of the impression-bed. Fig. 12 is an enlarged detail view showing the mechanism for operating the movable rest or roller. Fig. 13 is an enlarged front view of the same. Fig. 14 is an enlarged detail side view of the impression-bed, showing the mechanism for producing the impression. Fig. 15 is an enlarged detail side view of the mechanism for raising and depressing the spring-pawls. Fig. 16 is a sectional view showing the alining-bars and spacing devices. Figs. 17, 18, and 19 are enlarged detail views showing the automatic spacing devices and mechanism for actuating the same. Fig. 20 is a side view of a pinion and clutch whereby the cam-shaft is operated from the segment on the impression-bed shaft. Fig. 21 is an enlarged plan view showing the line as set up and the locking-bars. Fig. 22 is an enlarged front view of the mechanism for giving the alining-bars their side movement. Fig. 23 is a plan view of the same. Fig. 24 is an enlarged detail view of the limiting or locking bar J. Fig. 25 is a section of the impression-bed at right angles to its face, showing the screw for moving the matrix-plate. Fig. 26 is an enlarged sectional view through the eye of the type-arms. Fig. 27 is an enlarged front view showing the type-arms and plates for separating them, and also illustrating the operation of the movable rest or roller in lowering the type-arms. Fig. 28 is a front view illustrating the operation of the sweepers in raising the type-arms. Fig. 29 is a front view of the plates for separating the type-arms and of the stop-bar for limiting the forward movement of the lower end of each type-arm as it is pulled forward by its hook. Fig. 30 is a side view of the same. Fig. 31 is a detail sectional view of the ferrule or thimble $b'$ and plate $w^2$. Fig. 32 is an enlarged detail plan view of the mechanism for operating the leading-screw on the impression-bed. Figs. 33, 34, and 35 are side views of the same, showing the impression-bed in different positions. Fig. 36 is an enlarged detail view of one of the alining-bars and the leaf or bar for exerting pressure upon the spacing devices. Fig. 37 is a detail front view of the pushing-bar for moving the type-arms back into position after being used. Fig. 38 is a detail view of the type-support and the connections for operating the same.

In said drawings, A represents the frame or pedestal of the machine.

B are the parallel rods or supports upon which the type-arms C are mounted so as to swing pivotally and slide longitudinally thereon. Each type-arm consists of a thin flat bar having an eye or sleeve $c$ at its pivotal end which fits loosely on the stationary supporting-rod B. Each type-arm is furnished with an offset or bend $c'$ near its pivot end, so that when the type-arm is swung into a horizontal position it will not touch the other parallel supporting-rods B between it and the center of the machine. The type $c^2$ is secured near the outer end of the type-arm, preferably by being soldered or welded on, so that it projects at right angles to the type-arm and stands in a vertical position when the type-arm is raised into a horizontal one. If the parallel rods B should be arranged in an inclined plane instead of a horizontal one, it will be observed that the offsets or bends $c'$ in the type-arms would not be necessary to enable the several sets of arms to be raised to the same position, but such construction would, of course, necessitate the types of each set being placed at different angles to the arms, as each set of type-arms would lie in different inclined planes when raised for use, and for this and other obvious reasons I deem a horizontal arrangement of the parallel rods B in connection with the offsets in the type-arms to be the preferable mode of practicing my invention. The type-arms C for each character or kind of type are, of course, all alike and of the same length, but it will be observed that the type-arms of different sets or character are of different lengths, so that types of any set may be brought up into the same line by swinging any type-arm into a horizontal position, the length of the type-arms varying as the distance of the respective supporting-rods B from the center of the machine. The rear ends of the supporting-rods B are furnished with spiral springs $b$, which abut against a movable thimble or sleeve $b'$. The type-arms C when not in use are pressed by this spring and sleeve against a spring pawl or catch $b^2$, the outer or free end of which is furnished with a fork or recess $b^3$, that fits partially over the rod B. The other end of this spring-pawl $b^2$ is secured to a plate or bar $b^4$, attached by hinges $b^5$ to an arm $b^6$, which is pivoted to the impression-bed shaft R. The rods B are furnished with a guide groove or slot $b^7$, in which the hook-bar D reciprocates back and forth when actuated by the key $D'$ through a bellcrank lever $D^2$, pivoted to the frame of the machine by the shaft or rod $D^3$. The reciprocating hook-bar D consists of a thin flat bar fitting in the guide or slot $b^7$ in the stationary supporting-rod B, the free end of which is curved upward, preferably about as shown, so that the hook or catch $d$ will press or project against the inner surface of the eye or sleeve $c$ of the type-arms. As the type-arms on each rod are pressed closely together by the spring $b$ it is necessary to construct them so as to leave some space between them at the point where the hook $d$ engages with the type-arm, or to provide them with a notch, or to bevel the inner lower surface, as indicated at $c^3$, Fig. 26.

To insure that the hook $d$ shall always enter the eye of the type-arm in its backward movement, it is provided with the tail or projection $d'$, which is of sufficient length to remain within the eye of one or more of the type-arms behind the hook when a type-arm is pulled forward. Whenever a type-arm is pulled forward by the hook $d$, by depressing a key-lever, as above described, the spring $b$ moves the remaining type-arms forward until the one in front abuts against the spring-pawl $b^2$, thus taking the place of the one just pulled forward by the hook. To guard against more than one type-arm passing the spring-pawl $b^2$ when the hook $d$ is pulled rapidly forward, the upper part of the eye or sleeve must be provided with a notch or beveled, as shown in Fig. 26. To insure that the type-arms, when pulled rapidly forward, shall always be left in the same position with reference to the sweepers or elevating device, and also prevent them from vibrating, I provide a stopping-bar F, extending in front of the type-arms and near their lower end. This bar F is by arms $F'$ connected rigidly to the rocking shaft $F^3$, which runs in appropriate bearings in the frame of the machine. In pulling a type-arm forward by the hook $d$ the lower end of the type-arm will strike against the stopping-bar F, whereby its vibration and further forward movement are prevented.

After a type-arm has been pulled forward, as just described, it is next swung into a horizontal position by means of rotary sweeper-arms E, preferably four in number, secured to a shaft $E'$ or disk thereon, which is rotated to the right or left, according as the type-arm to be elevated is on the right or left side of the machine. Each of these sweeper-arms E is furnished at its free end with a light saddle or spring-bearing $e$ to engage the type-arm. This spring-bearing for the type-arms may preferably be made of about the form shown in the drawings at Figs. 1, 3, and 28. The purpose of providing the sweeper-arms with a spring-bearing for the type-arms to strike against is to prevent the quick movement of the sweeper-arm from knocking the type-arms violently. Without some cushioning device there would be danger of the sweeper-arms knocking the type-arms with such violence, when the machine is rapidly operated, as to injure them or disengage the type therefrom. It will be observed from Fig. 28 that the bearing-point $e'$ of this saddle-spring $e$ projects below the end of the sweeper-arm E and to one side thereof, so that the short type-arms as well as the long ones will be first struck some distance from their eyes or pivots. But for this construction the short type-arms would necessarily be first struck by the sweepers near their eyes, and consequently offer much greater resistance to the movement of the sweeper-arms and either receive or cause injury. As the sweeper-arm passes from a horizontal to a vertical position the type-arm, pulled forward by the hook on bar D, will be swung from a vertical to a horizontal position.

The sweeper-shaft $E'$ is put in operation at the same time and by the same movement of the key which pulls the type-arm forward from behind the spring-pawl.

The sweeper-arms E are provided with the brace-rods $e^2$ and adjusting-rods $e^3$, which are furnished with threaded ends and adjusting-nuts $e^4$. It will be observed from Fig. 3 of the drawings that the sweepers are dished or inclined so as to bring the saddle $e$ considerably to one side of the sweeper-arm, thus preventing the long type-arms from striking against it when being rapidly swung from a vertical to a horizontal position. After being brought into a horizontal position the type-arm is moved forward longitudinally on its supporting-rod at one end and on the movable type-support G at the other end into its proper position in the line by means of a reciprocating pushing-bar H, which is put in operation by the same movement of the key and is actuated automatically from the source of power by means of the connecting-rods H', lever $H^2$, and connecting-rods $H^3$ from the actuating mechanism. The type $c^2$ projects upward and moves along a path or way $C^2$, extending parallel to the rods B in the center of the machine. The pushing-bars H are provided at suitable intervals with a number of projections or fingers $h$, which project between the supporting-rods B and by the forward movement of said pushing-bar H push the elevated type-arm forward into its position in the line. To prevent the fingers from moving the elevated type-arm backward during the backward movement of the pushing-bar, I provide the flexible cam-bars $d^3$, which are secured to the same plate $b^4$ which carries the spring-pawls. The free ends of the cam-bars project close to the supporting-rods B, without touching them, however. During the backward reciprocation of the pushing-bar H the "heel" or hook $d^5$, which forms a part of it, will climb over the cam $d^4$ on said cam-bar $d^3$, thus lifting said pushing-bar sufficiently above the supporting-rods B to prevent the fingers $h$ from striking the elevated type-arm. The hook $d^5$ leaves the cam $d^4$ just before the pushing-bar reaches its backward limit, thus allowing the pushing-bar to drop down on its supporting-rods T', in which position the fingers will reach the elevated type-arm and push it forward during the forward movement of the pushing-bar.

The type-support G, which supports the line of type while being set up and while the impression is taken therefrom, is mounted on the end of an arm G', which is secured to the rock-shaft $G^2$, running in proper bearings on the supporting-column of the machine. This arm G' is swung forward and backward by means of a lever or crank-arm $G^3$ on the rock-shaft $G^2$, actuated by the rod $G^4$ from the cam $g$ on the main cam-shaft.

When a word in the line has been completed, a spacing device consisting of two plates or leaves I I', hinged together on a horizontal pivot $i$, is brought into position in the line by depressing an appropriate key $I^2$, which, through the bell-crank lever $I^3$, actuates the reciprocating-bar $I^4$, provided with a hook $i'$, adapted to engage and pull forward into position in front of the next type-arm when elevated one of the plates $I^5$, upon which the pivot of the hinged leaves I I' is mounted.

The flat bars or plates $I^5$, that carry the spacing devices I I' I I', run in a guide or race $I^6$, located upon the frame of the machine back of the sweeper-arms, consisting of a bottom and top plate and the vertical walls $I^7$ $I^8$, the latter of which also serves as a guide or support for the flexible reciprocating hook-bar $I^4$, the end of which is bent so as to press against the plates $I^5$ and catch against the end of one of said plates $I^5$, as illustrated in Fig. 17. The reciprocating hook-bar $I^4$ serves to pull the plate $I^5$ and spacing device thereon only part way, the spacing device being pulled into its proper position in the line by the next type-arm behind it, when the same is pushed forward by the pushing-bar H, as before described. The upper and lower edges of the hinged leaves I I' are beveled, as shown at $i^3$, so that even when the hinged leaves stand extended vertically the pressure exerted upon the edges on the leaves will not come on a line with their pivot and will, therefore, tend to close the leaves and make them operate as a knee-joint lever to increase the distance between the two adjacent words in the line. The hinge $i$ does not extend between the types. Consequently no more space is occupied by the leaves when standing vertically than their actual thickness, which must not exceed the thinnest "space" required between the words of a line. Each plate $I^5$, to which the leaves I I' are pivoted, is provided with stops or projections $i^4$ $i^5$ to prevent the leaves from closing in the wrong direction. When the line has been completed and a spacing device inserted between each two contiguous words, a stop or locking bar J is brought into position at the end of the line to determine its proper length according to the width of the column or page in which the line is to form a part. This locking-bar J is mounted in a suitable groove or guide in the alining-bar L at the side of the line, and it is provided with a hinged projection $j$ at its end, against which the end of the line abuts. The locking-bar J is provided with a number of notches which the catch $j'$ catches against, so as to lock a line of any length. The hinged projection $j$ is provided with a projection $j^3$ at a right angle, which strikes against the stop $j^5$ in the alining-bar L when the limiting-bar J is pushed back its full limit. The projection $j^3$ and stop $j^5$ are so beveled as to cause the projection $j^3$ to tip over into the recess $l'$ when striking against the stop $j^5$, thus making the projection $j$ extend in a straight line with the locking-bar J. When the locking-bar is pulled forward to lock the line, the projection $j^3$ strikes against the wall of the alining-bar, thus tipping the projection $j$ back into its former position at a right angle with the locking-bar. This arrangement of a hinged projection on the locking-bar J is necessary in order to prevent the spacing devices from striking said projection when being pulled forward into the line or pushed back into their position after being used. The other locking-bar J', reciprocating in suitable bearings in the straightening-bar L', is provided with a projection $j^2$, against which the other end of the line abuts. This bar J' is, by the set-screw $j'$, fixed in the proper position, according to the desired width of the page or column before the first line of such page or column is set up.

After a line has been completed and locked, as above described, pressure is exerted upon the spacing devices I I', between the several words in the line, by means of a plate or leaf $L^4$, one edge of which rests upon the leaves I I', the other edge being pivoted at $l^3$ to the straightening-bar L'. The pressure is exerted upon the leaf $L^4$ by means of the projection $l^4$ on the flat spring $m$, which is secured to the impression-bed, and which strikes the plate or leaf $L^4$ through an opening in the alining-bar L' when the impression-bed M is brought down to take the impression of the line. As the lower edge of the spacing devices or leaves I I' rests upon the bottom of the space-race, which forms part of the alining-bar L', the pressure brought to bear on the upper edge of said spacing devices causes the leaves to deflect from a straight line, thus increasing the distance between the words and forcing the types snugly together, unless already firmly locked, in which case the spring $m$ is simply deflected by striking against the plate or leaf $L^4$ in taking the impression.

One or both of the alining-bars L and L' have two movements—one to straighten the line by pressing on each side of the line of type and the other to level the face of the types by pressing downward on the type-arms. The former movement is produced by means of a wedge $l^6$, secured to the impression-bed M, said wedge or wedges being forced between the hooks or projections $l^7$ and $l^8$, secured, respectively, to the alining-bars L and L' by the downward movement of the impression-bed, thus pressing the alining-bars firmly against the sides of the types in the line, producing a perfectly straight line. The downward movement of the alining-bars for leveling the face of the types is produced by means of the flat spring $m'$, secured to the impression-bed, striking the alining-bars while the impression is being taken.

The alining-bars are separated the required distance to allow the types to drop down between them in distributing the line of type by means of a spring-cam $l^9$, secured to the impression-bed, which spring-cam is deflected by striking against the projection $l^{10}$ on the alining-bar L when the impression-bed moves downward, but passes said projection as the impression-bed reaches its downward limit. During the first part of the upward movement of the impression-bed said spring-cam $l^9$ operates against said projection $l^{10}$ to move the alining-bar L away from the line of type. As it is not convenient to provide a spring-cam for both alining-bars or for both ends of the alining-bar L, the parallel motion $l^{11}$ and $l^{12}$ for the alining-bars L and L', respectively, and the connecting-lever $l^{13}$ between the alining-bars are provided. This parallel motion consists of a rocking shaft running in appropriate bearings on the alining-bars, having two arms or levers $l^{14}$ passing through suitable openings in the frame of the machine. By moving one end of the alining-bar L the parallel motion $l^{11}$ causes the other end to move also, and the connecting-lever $l^{13}$ transmits this movement to the other alining-bar L', which is provided with a similar parallel motion $l^{12}$. After the alining-bars have in this way been separated to allow the types to drop down they are moved back into their former position by the spring $m^3$, secured to the alining-bar L, the free end of said spring striking against a projection on the frame of the machine.

The impression-bed M is mounted pivotally on a shaft R, so that it may be swung up in a vertical position, as shown in Fig. 3, out of the way after the impression has been taken. $M^2$ is the matrix-plate, to which any suitable matrix of wax or wood or other suitable material may be secured. This plate is mounted in suitable guides $m^4$ on the impression-bed and is provided with a leading-screw $q$, by means of which the matrix may be moved the distance of one line as each impression is taken.

The impression-bed is swung down into a horizontal position by means of the foot-lever N, pivoted at $n$ to the frame of the machine, and provided at the farther end with a toothed segment $n'$, which engages with a gear $n^2$ on the shaft $n^3$, that carries the wheel $n^4$, to which the pitman-rod $n^5$ is connected, said rod being connected at its other end with the segment or crank-arm R', secured rigidly to the shaft R. As shown in Fig. 3, the ear or projection on the segment R' through which the pivot-pin $n^6$ passes is covered by the flattened end of the connecting-rod $n^5$. This pitman-rod is connected to the segment R' by a pin $n^6$, which passes through a slot $n^7$ in the pitman-rod, so that after the impression-bed has been brought down into a horizontal position very near the line of type this slot will permit the pitman-rod to move upward as the wrist-pin $m^8$ on the wheel $n^4$ passes the center, while the impression-bed is still farther depressed to produce the impression by a more powerful mechanism.

The impression-bed is provided with a pair of rigid grappling-hooks $o$, which engage corresponding grappling-hooks $o'$ when the impression-bed has been brought near the face of the type by the mechanism above described. The grappling-hooks $o'$ are pivoted to a cross-bar $o^2$, which is connected by the rod $o^3$ with the toggle-levers $o^4$ $o^5$ $o^6$, the levers $o^4$ $o^6$ being pivoted to the standard G' near its lower end and said link or lever $o^5$ being pivoted to the ends of the levers $o^4$ $o^6$. These toggle-levers are operated from the foot-lever N by means of the connecting-rod $o^7$, pivoted at one end to the toggle-levers $o^5$ and $o^6$, the other end being provided with a slot $o^8$, through which the pin $o^9$ of the foot-lever passes. By this means a very powerful pressure may be exerted upon the impression-bed during the last quarter-inch of its movement, or while the impression is taken, while at the same time the impression-bed may be quickly swung down from a vertical position to a horizontal one. The grappling-hooks $o'$ are connected by a spring $o^{10}$ near their upper end, so as to cause them to automatically release the hooks $o$ when said hooks are raised to a certain point by the spring $o^{13}$, as shown in Fig. 14. The grappling-hooks $o'$ are provided with a cam projection $o^{11}$ near their upper end, which engages with the stationary cam $o^{12}$ on the standard G' and forces them apart, so as to cause them to engage the hooks $o$ as the hooks $o'$ are pulled down by the toggle-levers. The upper portions of the cam-surfaces $o^{11}$ on the hooks $o'$, it will be observed, are parallel, so that after the hooks are properly engaged with each other the farther downward movement of the hooks $o'$ will not be obstructed by the stationary cam-surface $o^{12}$. Impressions of uniform depth are secured by the stops $o^{14}$ impinging against the bar G.

The impression-bed is elevated automatically by means of the counterpoise-weight O, secured adjustably on the arm O', which is connected rigidly with the shaft R of the impression-bed. As it is desirable that this weight be heavy enough not only to elevate the impression-bed quickly, but also to operate the cam-shaft, and as the acting distance or counterbalancing effect of the impression-bed rapidly diminishes to zero as it nears the vertical, and as the cam-shaft does not offer a corresponding gradually-increasing resistance, a governor device is connected with the impression-bed shaft to regulate its movements and prevent any shocks or jars to the machine as the impression-bed reaches its vertical position. This governor device consists of a vessel or chamber P, containing mercury, glycerin, or other suitable fluid, provided with a piston P', having the rod $P^2$, which is furnished with teeth $p$ on one side, that engage with the teeth $p'$ of the segment $R^3$ on the impression-bed shaft. As the impression-bed is elevated this piston is thus forced down, and it is provided with a valve-opening $p^2$ and a puppet-valve $p^3$, which, by means of threads $p^4$, may be so regulated as to allow more or less of the fluid to pass through the valve-opening.

The leading-screw $q$, by means of which the matrix-plate $M^2$ is moved in its guides as the impression-bed recedes after taking the impression of each line, is actuated by means of a geared threaded nut $q'$, which turns on the leading-screw and is held stationary by the projecting ribs $q^2$, extending transversely across the impression-bed, and which meshes with the gear-wheel $q^3$, mounted on a shaft on the bracket $q^2$, projecting from the impression-bed. This wheel $q^3$ is turned by means of a lever $q^4$, provided with a pawl $q^5$, engaging with the teeth of said wheel, to which lever is pivoted a rod $q^6$, the other end of which is pivoted to an adjustable stud $q^7$, which may be moved up or down in the slot $q^8$ of the arm $q^9$, pivoted loosely to the impression-bed shaft, as a greater or less distance is required between the lines. The hub of the arm $q^9$ is provided with a pin or tooth which strikes against the pawl $q^{11}$ and holds the arm stationary during the receding movement of the impression-bed. The pawl $q^{11}$ turns somewhat tightly on its pivot and is provided with a tail end, against which a projection on the segment $R^3$ strikes to raise the pawl when the impression-bed arrives at its stationary position, and another projection on said segment strikes against said tail end to lower the pawl in front of said tooth when the impression-bed is brought far enough down to take an impression; but when not brought so far down the tooth of said hub will pass under said pawl $q^{11}$, allowing the arm $q^9$ to swing downward without operating the mechanism for moving the matrix. A pin in the impression-bed shaft, passing through a slot in the hub of arm $q^9$, moves this arm back into its proper position for the pawl $q^{11}$ to strike against the tooth on its hub. A spring $q^{15}$ tends to move the arm $q^9$ downward if not prevented by said pawl striking against said tooth.

The matrix-plate is actuated by the movement of the screw $q$, by means of a projection $q^{17}$ thereon, which projects through the slot $q^{18}$ in the impression-bed M and impinges against the matrix-plate $M^2$. The screw $q$ is prevented from revolving by a pin or key $q^{19}$ on one of the ribs or projections $q^2$, which fits in a longitudinal slot $q^{20}$ in the screw.

After the impressions have all been taken to complete the column or page the leading-screw is returned to its former position by revolving the gear $q^3$ in the opposite direction, said gear being provided with a crank $q^{27}$ for the purpose.

As the impression-bed is swung down to produce the impression the roller or rest K is swung up under the type-arms into position to receive and gradually lower them when the type-support G is removed after the impression has been taken. This is done by means of a cam $k$, secured to the impression-bed shaft, which cam depresses one end of the lever $k'$, to the other end of which is secured a beveled segment $k^2$, which meshes with a segment $k^3$ on the rock-shaft $k^5$, which carries the arm $K^4$, to which arm or wing $K^2$ is secured. By depressing one end of said lever $k'$ the free end of the arm or wing $K^2$ is swung from about a vertical to about a horizontal position by means of said bevel-segments and rock-shaft. The free end of said arm or wing $K^2$ has a forked projection which serves as support for a rock-shaft $K^3$, to which is secured rigidly the arm $K'$, which carries the roller or support $K$. To the rock-shaft $K^3$ is secured a bevel gear or segment $k^9$, which engages with the bevel gear or segment $k^{10}$, secured to the end of the shaft $k^{11}$, which passes through the arm or wing $K^2$. The other end of this shaft $k^{11}$ is provided with a lever $k^{12}$, which is operated by the stationary cam $k^{13}$, so as to make the support $K$ pass in a straight line at an angle of about forty-five degrees from the vertical when the arm or wing $K^2$ is swung from a vertical to a horizontal position, or vice versa, in the manner above described.

The cam-shaft $M^3$ is operated from the impression-bed shaft $R$ by means of a segment-gear $R'$, which meshes with a spur-gear $R^2$ on the cam-shaft. This gear $R^2$ fits loosely on its shaft and is provided with a pawl $r$, pivotally secured to said gear, and which engages in a suitable notch on the disk $r'$, which disk is rigidly secured to said cam-shaft so as to revolve said cam-shaft during the upward movement of the impression-bed, but during the downward movement of the impression-bed said cam-shaft remains, of course, stationary, as the pawl $r$ will then pass over the notch on the disk $r'$.

When the impression-bed first begins its upward movement the movable rest or roller $K$ remains stationary for a moment, and during this interval the cam $g$ on the cam-shaft $M^3$ swings the movable type-support $G$ forward, thus allowing the type-arms to rest upon the roller $K$, one of which is of course on each side of the machine. As the impression-bed continues its upward movement the rests or rollers $K$ are gradually lowered on lines inclined about forty-five degrees to the vertical, until all the type-arms are left hanging in a vertical position from their respective supporting-rods. The type-arms are next pulled back on their supporting-rods by means of a reciprocating bar $T$, which extends transversely immediately under the rods $B$, so as to engage the pendent type-arms near their eye.

The bar $T$ is supported at each end on stationary rods or guides $T'$, extending parallel to the supporting-rods $B$, the ends or eyes $t$ of the bar $T$ projecting upward and partially or wholly around the bars $T'$. The type-arm-pulling bar $T$ is given its movements backward and forward by a cam $s^5$ on the cam-shaft $M^3$, said cam actuating the levers $s'$, one at each end of the pulling-bar $T$, one end of which levers is pivoted to the shaft $s^2$, the other end being connected by the rods $T^2$ to the pulling-bar $T$. As the type-arms are pulled back by the bar $T$ in the manner just described the spring-pawls $b^2$ are elevated slightly, so as to allow the eyes of the type-arms to pass under them. This is done by the mechanism presently to be described. The spring-pawls $b^2$ are, as already stated, secured to the hinged plate or bar $b^4$, to which one end of the arm $V$ is rigidly secured, the other end resting on a cam $V'$ on the impression-bed shaft. This cam $V'$ is provided with a notch or indentation $v$, and when by the upward movement of the impression-bed, to which the shaft $R$, carrying said cam $V'$, is rigidly secured, said cam is made to turn so as to allow the free end of the lever or arm $V$ to reach said notch this end of the lever $V$ is depressed by the spring $v'$, thus raising the free end of the spring-pawls $b^2$. As the spring-pawls are required to be elevated only momentarily during the upward movement of the impression-bed, but not during its downward movement, the cam $V'$ cannot be fastened rigidly to the impression-bed shaft, but the proper movement is imparted to said cam $V'$ by a somewhat similar cam $V^2$, which is secured rigidly to said impression-bed shaft, connection between the two cams being secured by a pin $v^2$ in the cam $V^2$, passing through a slot in the cam $V'$. During the downward movement of the impression-bed the cam $V^2$ turns, while the cam $V'$ remains stationary, so as to cause the lever $V$ to rest on said cam $V^2$, while the free end of said lever is carried over said notch $v$ in the cam $V'$. The cam $V'$ is then moved forward by said cam $V^2$ during the farther downward movement of the impression-bed. During the receding movement of the impression-bed the cam $V'$ remains for some time stationary, the lever $V$ resting upon it, while the cam $V^2$ turns so as to allow the free end of the lever $V$ to drop down into the notch $v$, when the cam $V'$ is finally turned by the cam $V^2$ by means of the connecting-pin $v^2$.

In order to prevent the type-arms from becoming entangled while being pushed back behind their retaining-pawls and at other times, I separate the type-arms depending from different rods by thin plates $S$, which are secured to a suitable plate fastened to the frame of the machine. These plates may extend any desired distance from the supporting-rod, but must of course be somewhat shorter than the adjoining type-arms.

In order to guard against a type-arm striking the edge of a plate, whereby it might be prevented from entering its proper box or stall between the plates, the plates are made somewhat wider at the top than at the bottom, that is to say, they are slanting downward, so that if a type-arm should strike the edge it will easily slide off. The width of the plates is of course limited by the path required by the sweepers, as the type-arms must be out of their respective boxes before being struck by the sweepers.

To prevent the pushing-bar $H$ from interfering with the type-arms as they are pushed back behind the spring-pawls after being used to form a line, said pushing-bar is moved back upon the flexible cam $d^3$, while the distribution of the type-arms takes place by means of the levers $z$ on the rock-shaft $z'$, which is actuated by a pin $z^2$ on the piston-rod $P^2$, which pin strikes against the cam-lever $z^3$ on the rock-shaft $z'$, the bent end at the levers $z$ striking against the vibrating arms $H^2$, so as to throw them back, when the piston-rod $P^2$ is raised by swinging the impression-bed forward. As will be seen from the drawings, Fig. 3, the cam-lever $z^3$ remains tipped forward during most of the downward and upward movement of the impression-bed, thus holding the pushing-bar stationary on the cam-surface of the springs $d^3$, but allows the pushing-bar to assume its former position as soon as the impression-bed has reached its vertical position.

As it is not desirable to have the type-arms behind the retaining-pawls $b^2$ pushed forward by the spring $b$ when said pawls are raised suitable means are provided for pulling the thimble or ferrule $b'$ back when the pawls are raised, so as to prevent the spring from interfering with the free movement of the type-arms, as those used in the line are pulled back by the bar T. For this purpose the thimble $b'$ is provided with a headed pin $w$, which passes through a slot $w'$ in the plate $w^2$. This plate $w^2$ is pulled back just before the retaining spring-pawls $b^2$ are raised by a cam $w^3$ on the cam-shaft $M^3$, said cam actuating the upright lever $w^4$, one end of which is pivoted loosely to the shaft $s^2$, the other end being forked and connected with said plate $w^2$ by a suitable connection. As soon as all the type-arms have been pulled behind the spring-pawls and these have been pressed down upon the rods B to prevent the springs $b$ from pushing them forward on the rods until a type-arm is pulled forward by the hook-bar D the plate $w^2$ is returned to its former position by said cam $w^3$ or a suitable spring holding said lever $w^4$ up to said cam. At the same time the bar T is returned to its former position by the cam $s^5$ or a suitable spring holding the upright lever $s'$ against the same.

To allow the type-arms to pass behind the stop-bar F as they are pulled back by the bar T, said stop-bar F is lowered by a lever $F^4$ on the rock-shaft $F^3$, one end of said lever being rigidly secured to said rock-shaft, the other end being held in position by a lever $F^5$, secured rigidly to the hub of the lever $w^4$, and consequently actuated by the same cam $w^3$, said levers $F^5$ and $F^4$ being raised as the upright lever $w^4$ is moved back by said cam $w^3$, thus allowing said stop-bar F to drop down to allow the type-arms to pass behind it, the forward movement of said lever $w^4$ again depressing said levers $F^5$ and $F^4$, thus raising the stop-bar F into its former position.

It will be observed from Fig. 26 that the hook on the hook-bar D is concealed within the rod B when the key-lever $D^2$ is not depressed. Consequently said hook offers no obstruction to the type-arms as they are pulled back into their position behind the spring-pawls.

The bar T is at its center provided with an upright pin which pushes the spacing devices back into their original position at the same time said bar T pushes the type-arms back into their position behind the spring-pawls.

The separate hook-bars D are operated directly from their appropriate keys, as before stated, but the sweeper-arms E and the pushing-bar H, which of course move whatever key is depressed, are operated by power which is simply set in motion by the depression of the key. On the shaft $D^3$, to which the bell-crank levers $D^2$ are pivoted, arms $D^4$ are also pivoted, to which is secured rigidly a bar $D^5$, extending transversely just in front of the vertical arms of said levers $D^2$, so that whatever key is depressed this rocking frame or bar $D^5$ will be moved in one direction, a suitable spring moving it in the other direction. The rocking frame $D^5$ is connected by a rod $D^6$ with a lever $x$, pivoted near its middle to the frame of the machine, and which operates a catch or pawl that releases the power or weight, so that it will, through appropriate connecting mechanism, operate the sweeper-shaft $E'$ and the pushing-bar H every time a key is depressed.

As the sweeper-shaft turns in opposite directions when keys on opposite sides of the machine are depressed, separate rocking frames and connecting-rods for each side of the machine are of course provided, but in the machine here described only one sweeper-shaft and one weight for operating the same are employed.

The shaft $E'$, carrying the sweepers E, is revolved by the weight 2, suspended from the endless chain 3, which passes over the pin-gears 4 and 5 in opposite directions, said weight tending to revolve the gears 6 and 7 in opposite directions. The gears 6 and 7 engage with the pinions 8 and 9, respectively, which are secured to the star-wheels 10 and 11, respectively, said star-wheels being prevented from revolving by one of the pins 12 of each wheel striking or pressing against the stop 13, secured to the frame 14. The gears 6 and 7 and 10 and 11 run loose on their respective shafts, being held in position by suitable sleeves. The disk or wheel 15 is permanently secured to the sweeper-shaft $E'$ by means of a pin. This disk has a number of holes whose size and position correspond to the pins 12 of each wheel 10 and 11.

By depressing any of the keys $D'$ the bell-crank $D^2$ strikes against the rocking frame $D^5$, imparting to it a slight movement. This rocking frame is by the wires or rods $D^6$ connected with one end of the lever $x$ or $y$, the other end being connected with the pawls $x'$ or $y'$ on the rocking shaft 20, which also has the short levers or pawls 21 and 22. The lever 21 serves to push the pin 23 against the pin 12, so as to make it enter the hole just opposite to it in the disk 15 and at the same time pass by the stop 13, thus allowing the wheel 10 or 11 to revolve, carrying the disk 15 with it, and consequently revolving the shaft E'.

It will thus be understood that by depressing any of the keys D' the shaft E' may be made to revolve in opposite directions, according as a key on one or the other side of the center of the machine is depressed, the direction in either case being the one required to operate the sweepers so as to elevate the type-arm thrown forward by the key depressed. As I prefer to employ four sweepers the shaft E' must of course make a quarter of a revolution for elevating each type-arm. Consequently the wheels 10 and 11 must each have four pins 12 and the disk 15 four holes to receive either of said pins. The pins 12 have each a spring $12^a$, which tends to keep each pin in such a position as to strike against the stop 13 when the wheel 10 or 11 revolves, and consequently stop its motion, thus preventing the wheel from revolving more than a quarter of a revolution. When a pin 12 is pushed into a hole in the disk 15 and made to pass the stop 13, the pin is prevented from being pushed back again by its spring $12^a$ before the wheel 10 or 11 (and consequently the disk 15 and shaft E') has made a quarter of a revolution by sliding along a parallel surface 24, which extends in a curved line from the stop 13 for nearly a quarter of the circumference of the wheel 10 or 11, the pin leaving said surface, thus allowing its spring to withdraw it from the hole in the disk 15 as soon as or a little sooner than the next pin strikes the stop 13. In order to always keep the disk 15 in the proper position for the pin 12 to enter one of the holes $15^a$ and also to stop the further revolution of the shaft E' from the momentum of the sweepers when the pin 12 is withdrawn from the hole in the disk 15, said disk is provided with four pins $15^b$, one of which strikes against one of the two pawls 25 at every quarter of a revolution, another pin passing under the other pawl, which thereupon is pressed down by its spring. By this means the shaft E' is firmly held in its position by the two pawls 25. Each of these pawls is secured to one end of a rocking shaft 26, (one of which is shown in Figs. 7 and 8, and also by dotted lines in Fig. 9.) To the other end of said rocking shaft is secured a lever or pawl 27, Figs. 7 and 8, between which and the lever 22 on the rocking shaft 20 connection is obtained through a movable pin or tappet 28, passing through the frame 14, as shown in Figs. 7 and 8. As the lever 22 is secured to the same rocking shaft as the lever 21 it will be understood that the pawl 25 is raised, so as to pass over the pin $15^b$ in the disk 15 simultaneously with the pushing of the pin 12 into its corresponding hole in the disk 15, which is thus allowed to revolve a quarter of a revolution, after which it is again stopped by the pawl 25 striking the next pin in the disk. The pin 23 is held against the lever or pawl 21 by a coiled spring $23^a$, as shown in Fig. 8. Besides revolving the shaft E' the weight 2 also serves to actuate the reciprocating pushing-bar H by the mechanism presently to be described. The wheels 10 and 11 have each four cams 30, Figs. 8 and 9, which serve to swing the lever 31 at each quarter revolution. The lever 31 is pivoted near its middle to the frame 14, one end being struck by said cam as the wheel 10 or 11 revolves, the other end being connected by the rod $H^3$ with the vibrating arm $H^2$ or to a lever secured to the same shaft as said vibrating arm.

The vibrating arms $H^2$ on each side of the machine, Fig. 4, are at their lower ends secured to the shaft $H^{10}$, thus forming a rigid frame, and carry at their upper ends by pivotal connections the rods H' H', which connect the pushing-bar H with the said vibrating arms. The cam 30 on the wheel 10 or 11 merely serves to give the pushing-bar H its backward reciprocation, the spring $H^9$, attached to the vibrating-arm $H^2$, giving it its forward reciprocation to push the type-arm into its proper place in the line.

In order to permit the raising of the weight 2, the pin-gear 5 is, through a ratchet-wheel $5^a$ and pawl $5^b$, connected with the wheel 7. One loop of the chain 3 passes under a sheave in said weight and the other loop through a pulley $2^a$, which passes through a slot in the weight at one side of said sheave. A shield (not shown in the drawings) prevents the pulley and that part of the chain passing through the slot from interfering with the free movement of said sheave, the slot or opening in the weight being thereby divided longitudinally into two slots, one for the sheave and the other for the chain and pulley. To the hook in the pulley $2^a$ is attached one end of a chain $3^b$, which passes under a sheave at the base of the column A, (not shown in the drawings,) the other end of which is fastened to the shaft $3^c$, which is revolved by a handle $3^d$ on the wheel $3^e$. The winding of the weight is most conveniently done after taking each impression and while the impression-bed recedes and the type-arms are distributed or returned to their original position.

It should be observed that no attempt has been made in the drawings to show the proper shape or outline of any of the cams in the machine, but the motions of the parts being described it is an easy matter to give the cams their proper outlines to produce the movements.

The machine herein shown and described is, in its particular construction and in many of its novel devices and novel combinations of devices, the joint invention of myself and Christian C. Hill, and I therefore do not herein make any claim to the same as my sole invention, except in respect to certain broad features or combinations, herein more specifically set forth in the claims, and which have heretofore been pointed out in describing wherein my invention consists. I have herein for convenience described those features which are my sole invention in connection with the machine jointly invented by myself and said C. C. Hill, and I hereby expressly disclaim as my sole invention all that subject-matter which is claimed in the joint application of myself and said C. C. Hill, filed of even date herewith.

The companion joint application of Peterson and Hill hereinabove referred to is serially numbered 196,062, and reference is hereby expressly made thereto and to the patent thereon to be granted for the purpose of distinguishing more definitely and certainly between the subject-matter herein claimed as my sole invention and the subject-matter therein claimed as the joint invention of said Peterson and Hill. For example, the stationary supporting-rods B, with the longitudinally-movable and pivotal or swinging type-arms C mounted thereon, is, broadly, my sole invention, while the combination of these devices with the mechanism, substantially as described herein, for sliding said type-arms on said rods and means, substantially as described, for swinging said type-arms pivotally is the joint invention of said Hill and myself, as will be more clearly understood by reference to claim 3 of said joint application, Serial No. 196,062, and to claim 1 of this application. So, too, certain peculiarities of construction of the type-arms C, as set forth in claims 1 and 2 of said joint application, are the joint invention, while other peculiarities of construction of the type-arms—viz., their bends or offsets $c^2$ to adapt them to coact with the parallel supporting-rods B—are my sole invention. Generally speaking, the subject-matter claimed in my sole application covers the broad primary or generic forms or combinations of certain of the devices, while the claims or subject-matter of said joint application, in so far as they cover the same devices or combinations of devices, embrace improved forms of construction of said devices or improved and more limited combinations thereof, as will be readily understood by those skilled in the art by comparison of the claims.

I claim—

1. The combination of stationary supporting-rods, B, with type-arms, C, having both a longitudinal and a pivotal swinging movement thereon, substantially as specified.

2. The combination of parallel supporting-rods, B, arranged in the same horizontal plane, with type-arms, C, mounted loosely thereon so as to turn pivotally and slide longitudinally, and provided with bends or offsets, $c'$, near their pivoted end, substantially as described.

3. The combination of the type-arms, C, mounted to turn pivotally and slide longitudinally on their supporting-rods, B, with a pushing-bar, H, provided with fingers, $h$, for moving said type-arms forward, substantially as described.

4. The combination of a pivoted or swinging type-arm, C, with a sweeper-arm, E, for elevating said type-arm, substantially as described.

5. The combination of swinging type-arms, C, with sweeper-arms E, provided with a spring or cushion for the type-arms to strike against, substantially as described.

6. The combination of swinging type-arms, C, with sweeper-arms, E, provided with a saddle, $e$, and a curved spring-bearing, $e'$, substantially as and for the purpose specified.

7. The combination with swinging type-arms of a rotary sweeper-arm, having its end or bearing, against which said type-arms strike, projecting to one side, to prevent the type-arm entangling with said sweeper-arms, substantially as described.

8. The combination with swinging type-arms, C, arranged part on each side of the line, of a rotary sweeper-arm, E, having a saddle, $e$, and a spring-bearing, $e'$, on each side, to elevate the type-arms on either side of the center of the machine, according as the sweeper-arm is rotated one way or the other, substantially as described.

9. The combination with swinging type-arms, of rotary sweeper-arms, four in number, arranged at a right angle to each other, substantially as and for the purpose specified.

10. The combination of supporting-rods B, with swinging type-arms C of different lengths, and a device for gradually lowering the type-arms, the form and path of said device being such substantially as described that each type-arm rests upon said device until it reaches a vertical position, and means for moving said device, substantially as specified.

11. The combination of support-rods, B, type-arms, C, and a support for lowering said type-arms, moving at an angle of about forty-five degrees to the vertical, so that all the type-arms will rest thereon until they reach a vertical position, and mechanism for moving said support in the angular path described, substantially as described.

12. The combination of supporting-rods, B, with type-arms, C, and a rest or roller, K, for lowering said type-arms, of sufficient diameter substantially as described to prevent the longer type-arms from crossing the type on the shorter type-arms, as they are lowered and means for lowering said roller K, substantially as described.

13. In a machine for the purpose stated, the combination of a key-lever, $D^2$, with a pushing-bar, H, and intermediate mechanism substantially as described for giving said pushing-bar a reciprocating movement by depressing a key-lever, substantially as, and for the purpose, specified.

14. The combination of swinging and longitudinally-moving type-arms with sweeper-arms for elevating said type-arms, and a pushing-bar, H, for pushing them forward into their proper place in the line, substantially as described.

15. In a machine for the purpose stated, the combination of a key-lever, $D^2$, with sweeper-arms, E, and intermediate mechanism substantially as described for giving said sweeper-arms a rotary movement, by depressing a key-lever, substantially as, and for the purpose, specified.

16. The rocking frame, $D^5$, in combination with key-levers and mechanism substantially as described for elevating swinging type-arms, substantially as specified.

17. The combination of key-levers, $D^2$, and rocking frame, $D^5$, with pushing-bar, H, and intermediate mechanism substantially as described for giving said pushing-bar a reciprocating movement by depressing any of the key-levers, substantially as, and for the purpose specified.

18. The combination with rotary or swinging type-arms, of an operating-key and an auxiliary power substantially as described set in action by said operating-key, to swing said type-arms into position, substantially as specified.

19. The combination with a sliding type-arm, of an operating-key and an auxiliary power substantially as described set in action by said operating-key, to slide said type-arm into position, substantially as specified.

20. The combination with a swinging and sliding type-arm, of an operating-key and an auxiliary power substantially as described set in action by said operating-key, to swing and slide said type-arm into position.

21. In a machine for the purpose stated, the bar, F, in combination with sliding type-arms, substantially as and for the purpose specified.

22. In a machine for the purpose stated, the combination of the parallel guide-plates S with swinging and sliding type-arms and their stationary supporting-rods for the purpose of preventing the type-arms from entangling while in a vertical position, substantially as specified.

23. The combination with a bed or support for the type-arms, of an alining-bar on each side of the line, one of which is movable both vertically and horizontally, so as to both straighten the line and level the face of the type, substantially as described.

24. The combination with the pushing-bar, H, and swinging type-arms, of a suitable device substantially as described for moving said pushing-bar backward or raising it, so as to prevent its interference with the type-arms as they are pushed back into their original position after being used to form a line, substantially as described.

O. M. PETERSON.

Witnesses:
 H. M. MUNDAY,
 EDMUND ADCOCK.